G. A. VOLBY.
TRACTION WHEEL.
APPLICATION FILED FEB. 21, 1914.
1,118,164.
Patented Nov. 24, 1914.
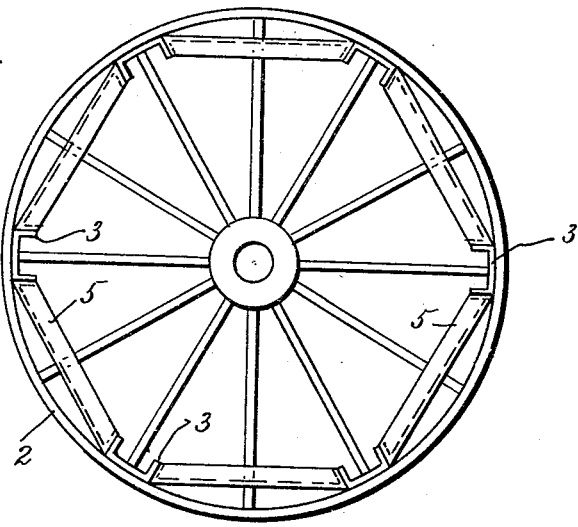
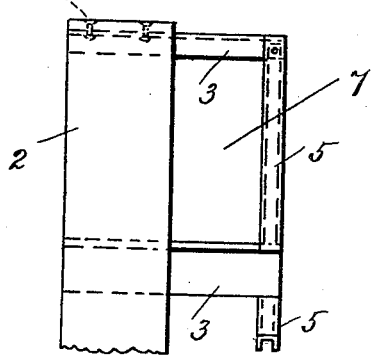
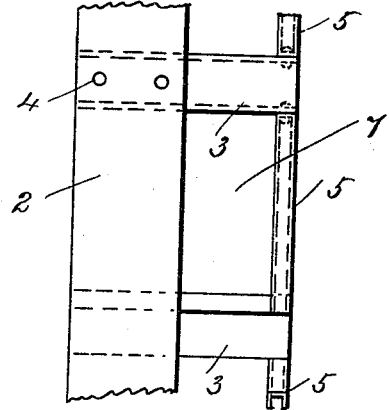
Witnesses
Wm. H. Day
H. G. Purcell
Inventor
Gustav A. Volby,
By Herbert W. Jenner.
Attorney

UNITED STATES PATENT OFFICE.

GUSTAV A. VOLBY, OF WILLISTON, NORTH DAKOTA.

TRACTION-WHEEL.

1,118,164.      Specification of Letters Patent.      Patented Nov. 24, 1914.

Application filed February 21, 1914. Serial No. 820,246.

*To all whom it may concern:*

Be it known that I, GUSTAV A. VOLBY, a citizen of the United States, residing at Williston, in the county of Williams and State of North Dakota, have invented certain new and useful Improvements in Traction-Wheels; and I do hereby declare the following to be a full, clear, and exact description of the invention, such as will enable others skilled in the art to which it appertains to make and use the same.

This invention relates to the road wheels of traction engines; and it consists in the novel construction and combination of the parts hereinafter fully described and claimed.

In the drawings, Figure 1 is a side view of a traction wheel constructed according to this invention. Fig. 2 is a front view of a portion of the wheel. Fig. 3 is a plan view of the parts shown in Fig. 2.

The main tread 2 of the wheel is a cylindrical ring of metal, and it is provided with a hub and spokes in any approved way. The external surface of the tread 2 is not provided with projections for engaging with the soil or road, but in order to prevent the wheel from slipping on soft ground, bars 3 are secured to the inside of the periphery of the tread by rivets or bolts 4. These bars are preferably channel-shaped in cross-section, for strength and lightness, and they project laterally from one side of the wheel tread or rim, and are arranged parallel to each other. Braces 5 are secured between the free end portions of the bars 3, and these braces are channel-shaped in cross-section, but may be of any other approved shape. The braces or brace bars 5 are straight so that their middle portions do not bear on the ground unless the bars 3 sink deeply into it, and open rectangular clearance spaces 7 are formed between the brace bars 5 and the edge of the wheel tread 2.

The faces of the bars are held clear of the road while the engine is running over hard ground, but when the engine passes onto soft ground and the treads of its traction wheels sink into the ground, the bars 3 are brought into contact with the ground, and engage with it so that the wheel is prevented from slipping.

What I claim is:

The combination, with a traction wheel, of a series of bars secured to the wheel tread and projecting laterally at one side of it, and a series of brace bars secured between the free end portions of the projecting bars, said brace bars being arranged in polygonal form, and open radial spaces being provided between one side of each brace bar and the edge of the wheel tread and between the sides of the projecting bars.

In testimony whereof I have affixed my signature in the presence of two witnesses.

GUSTAV A. VOLBY.

Witnesses:
  IRA BREE,
  NOAH PANGER.

Copies of this patent may be obtained for five cents each, by addressing the "Commissioner of Patents, Washington, D. C."